US012496248B2

(12) United States Patent
Summer

(10) Patent No.: US 12,496,248 B2
(45) Date of Patent: Dec. 16, 2025

(54) HEADBAND THAT CONTRACTS IN SYNCHRONY WITH INSPIRATION DURING SLEEP

(71) Applicant: John Summer, Portland, OR (US)

(72) Inventor: John Summer, Portland, OR (US)

( * ) Notice: Subject to any disclaimer, the term of this patent is extended or adjusted under 35 U.S.C. 154(b) by 95 days.

(21) Appl. No.: 16/936,702

(22) Filed: Jul. 23, 2020

(65) Prior Publication Data

US 2025/0205109 A1 Jun. 26, 2025

(51) Int. Cl.
*A61H 9/00* (2006.01)

(52) U.S. Cl.
CPC ......... *A61H 9/0085* (2013.01); *A61H 9/0007* (2013.01); *A61H 2201/0103* (2013.01); *A61H 2201/1207* (2013.01); *A61H 2201/1238* (2013.01); *A61H 2201/1607* (2013.01); *A61H 2201/165* (2013.01);
(Continued)

(58) Field of Classification Search
CPC ................ A61H 9/0085; A61H 9/0007; A61H 2201/0103; A61H 2201/1207; A61H 2201/1238; A61H 2201/1607; A61H 2201/165; A61H 2201/5056; A61H 2201/5058; A61H 2205/02; A61H 2230/405
See application file for complete search history.

(56) References Cited

U.S. PATENT DOCUMENTS

2017/0135894 A1* 5/2017 Jones, Jr. ............... A61H 7/006
2020/0281810 A1* 9/2020 Nanasawa ............. A61L 31/022

OTHER PUBLICATIONS

CN 107997768 A (Year: 2018).*
(Continued)

*Primary Examiner* — Victoria Murphy

(57) ABSTRACT

The present invention discloses a head piece, such as a headband or helmet, that fits around the cranium and includes one or more contractile elements which contract in synchrony with inspiration during sleep. The head piece is connected to a breath sensor which signals the timing of inspiration and software which incorporates the generated timing signals from the breath sensor to control the timing and release of the contraction of the head piece to coordinate with the user's breath. The breath sensor may comprise a variety of mechanisms such as a flow valve in the tubing of a CPAP or other type of automated breathing machine, an anemometer such as a hot wire anemometer to directly detect airflow in front of the nose or mouth, acoustic sensors to record breathing sounds, or a radar detector that monitors chest or abdomen movements from above the bed. In the illustrated embodiments, the breath sensor is a chest band that signals inspiration by recording an increase in tension produced by expansion of the chest. Coupling expansion of the chest with compression of the cranium is advantageous, because these movements occur simultaneously and because the expansion of the chest occurs with much greater force than the compression of the cranium, therefore the natural expansion of the chest can power the compressive forces which are desirably applied to the cranium. The chest band and head piece can be coupled to provide such a self powered head pumping mechanism by an electrical connection or a tube that permits flow of a liquid or air between the two areas.

20 Claims, 3 Drawing Sheets

(52) U.S. Cl.
CPC ................ *A61H 2201/5056* (2013.01); *A61H 2201/5058* (2013.01); *A61H 2205/02* (2013.01); *A61H 2230/405* (2013.01)

(56) References Cited

OTHER PUBLICATIONS

CN 108158795 A (Year: 2018).*
JP 2000300632 (Year: 2000).*
RU 2297820 C2 (Year: 2007).*
WO 2014030737 A1 (Year: 2014).*

* cited by examiner

HEADBAND THAT CONTRACTS IN SYNCHRONY WITH INSPIRATION DURING SLEEP

BACKGROUND

Breathing is an important source of circulation of cerebrospinal fluid in the brain during sleep, because inspiration creates negative pressures that help draw cerebrospinal fluid from its sources deep in the brain through the subarachnoid spaces and outward and downward from the cranium to drain into the lymphatic vessels. During expiration, arterial pressure acts to replenish cerebrospinal fluid in the cranium. Assisting the natural cerebrospinal fluid drainage during inspiration by slightly compressing the cranium in synchrony with inspiration can improve brain health.

The glymphatic system provides a para-arterial influx route for cerebrospinal fluid (CSF) to enter the brain parenchyma and provides a clearance mechanism for removing interstitial fluid (ISF) and extracellular solutes from the interstitial compartments of the brain and spinal cord. Cerebrospinal fluid (CSF) is a clear, colorless body fluid found in the brain and spinal cord. CSF acts as a cushion or buffer, providing basic mechanical and immunological protection to the brain inside the skull and taking part in the autoregulation of cerebral blood flow. Exchange of solutes between CSF and ISF is driven primarily by arterial pulsation and regulated during sleep by the expansion and contraction of brain extracellular space. Convective bulk flow of ISF, facilitated by astrocytic aquaporin 4 (AQP4) water channels, provides a clearance mechanism for soluble proteins, waste products, and excess extracellular fluid.

CSF occupies the subarachnoid space between the arachnoid mater and the pia mater and the ventricular system around and inside the brain and spinal cord. It fills the ventricles of the brain, cisterns, and sulci, as well as the central canal of the spinal cord. The subarachnoid space is connected to the bony labyrinth of the inner ear via the perilymphatic duct, where the perilymph is continuous with the cerebrospinal fluid. Cilia on the apical surfaces of ependymal cells of the choroid plexuses beat to move the CSF through the ventricles.

Each day, specialized ependymal cells in the choroid plexuses of the ventricles of the brain produce about 500 ml of CSF and arachnoid granulations absorb CSF at a similar rate. Only about 125 mL of CSF resides in the body at any one time.

CSF circulates within the ventricular system of the brain. The two lateral ventricles produce most CSF, and from there, CSF passes through the interventricular foramina, the third ventricle, the cerebral aqueduct, the fourth ventricle. CSF passes from the fourth ventricle into the subarachnoid space through four openings—the central canal of the spinal cord, the median aperture, and the two lateral apertures. CSF appears in the subarachnoid space, which covers the brain, spinal cord, and extends below the end of the spinal cord to the sacrum. The subarachnoid space connects to the bony labyrinth of the inner ear making the cerebrospinal fluid continuous with the perilymph in most people.

CSF returns to the vascular system by entering the dural venous sinuses via arachnoid granulations, outpouchings of the arachnoid mater into the venous sinuses around the brain having valves to ensure one-way drainage. A pressure difference between the arachnoid mater and venous sinuses pushes CSF through those valves. CSF also drains into lymphatic vessels surrounding the nose via drainage along the olfactory nerve through the cribriform plate. CSF is also reabsorbed through the sheathes of cranial and spinal nerve sheathes, and through the ependyma.

Since the body regenerates its 125 ml volume of CSF three to four times a day, the glymphatic system provides waste clearance pathway for the vertebrate central nervous system. The pathway consists of a para-arterial influx route for cerebrospinal fluid (CSF) to enter the brain parenchyma, coupled to a clearance mechanism for the removal of interstitial fluid (ISF) and extracellular solutes from the interstitial compartments of the brain and spinal cord. Exchange of solutes between CSF and ISF is driven primarily by arterial pulsation and regulated during sleep by the expansion of brain extracellular space when a person inhales and contraction of that space when a person exhales. Convective bulk flow of ISF clears soluble proteins, waste products, and excess extracellular fluid. Dural sinuses and meningeal arteries are lined with conventional lymphatic vessels providing a connecting pathway to the glymphatic system. Glymphatic flow provides a drainage pathway for extracellular proteins, excess fluid, and metabolic waste products.

The restorative properties of sleep may be linked to increased glymphatic clearance of metabolic waste products produced by neural activity in the awake brain. When a person inhales, downward movement of the diaphragm lowers blood pressure in the brain, and when the person exhales, upward movement of the diaphragm increases blood pressure in the brain. This respiration-driven periodic variation in blood pressure in the brain produces a periodic variation in pressure on the glymphatic system, causing the glymphatic system to pump CSF through the one-way valves leading into the venous sinuses. The deep breathing that typically occurs during sleep increases the periodically varying pressure on the glymphatic system so it pumps CSF into the venous sinuses more quickly, thereby increasing waste clearance efficiency though CSF-ISF exchange.

The glymphatic system may be impaired after acute brain injuries such as ischemic stroke, Intracranial hemorrhage, or subarachnoid hemorrhage. Neurodegenerative diseases such as amyotrophic lateral sclerosis, Alzheimer's disease, Parkinson's disease, and Huntington's disease are all characterized by progressive loss of neurons, cognitive decline, motor impairments, and sensory loss. Collectively these diseases fall within a broad category referred to as proteinopathies due to the common assemblage of misfolded or aggregated intracellular or extracellular proteins. According to the prevailing amyloid hypothesis of Alzheimer's disease, the aggregation of amyloid-beta (a peptide normally produced in and cleared from the healthy young brain) into extracellular plaques drives the neuronal loss and brain atrophy that is the, hallmark of Alzheimer's dementia. Although the full extent of the involvement of the glymphatic system in Alzheimer's disease and other neurodegenerative disorders remains unclear, there has been evidence that the proper function of the glymphatic clearance system is necessary to remove soluble amyloid-beta from the brain interstitium.

What is needed is a system for improving CSF clearance in people that may have impaired glymphatic systems, including people exhibiting symptoms of neurodegenerative diseases.

ILLUSTRATIONS

DETAILED DESCRIPTION

Figure 1:
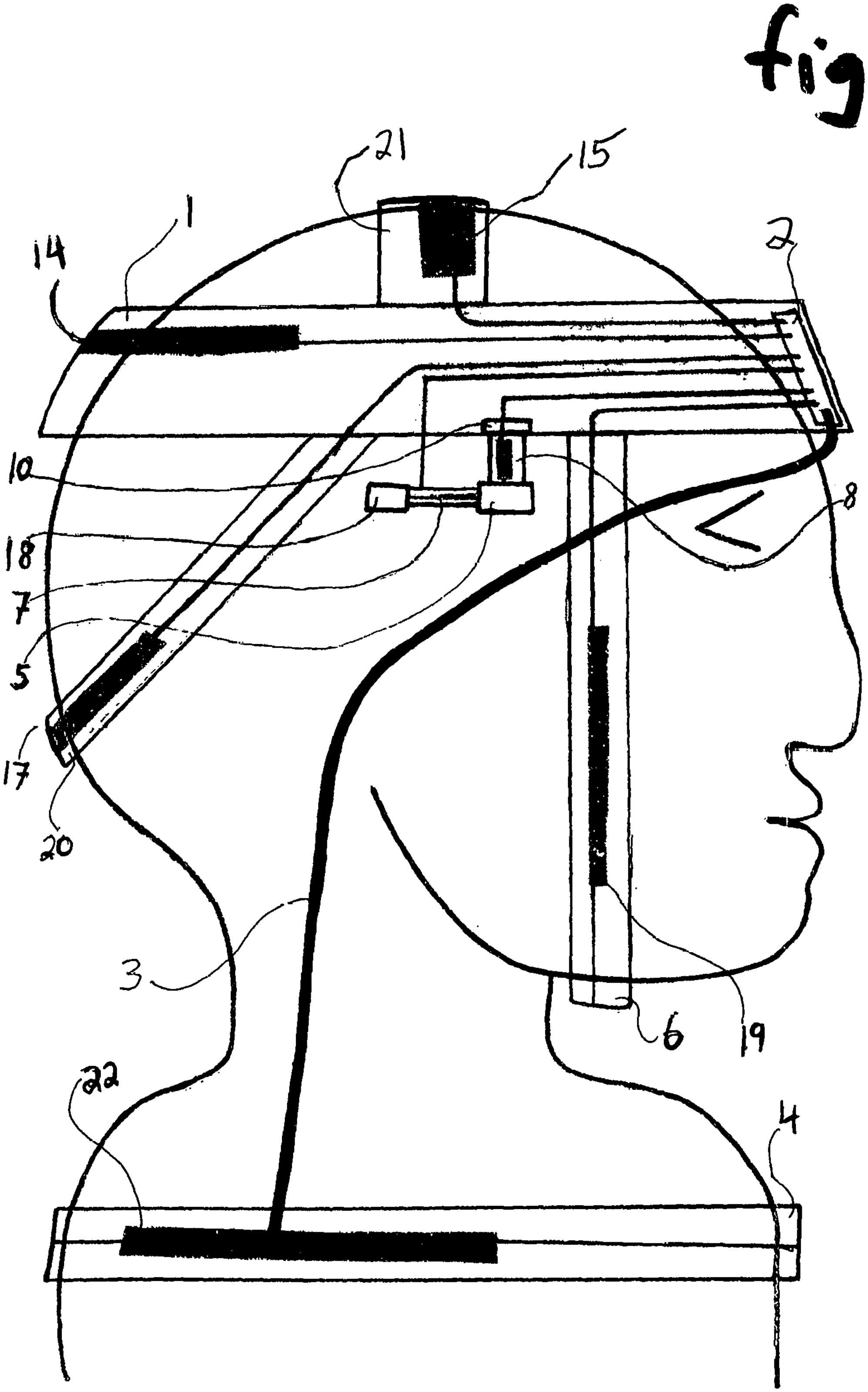
FIG. 1 shows a side view of a first embodiment in which headband and chest band are connected electrically.
Figure 2:
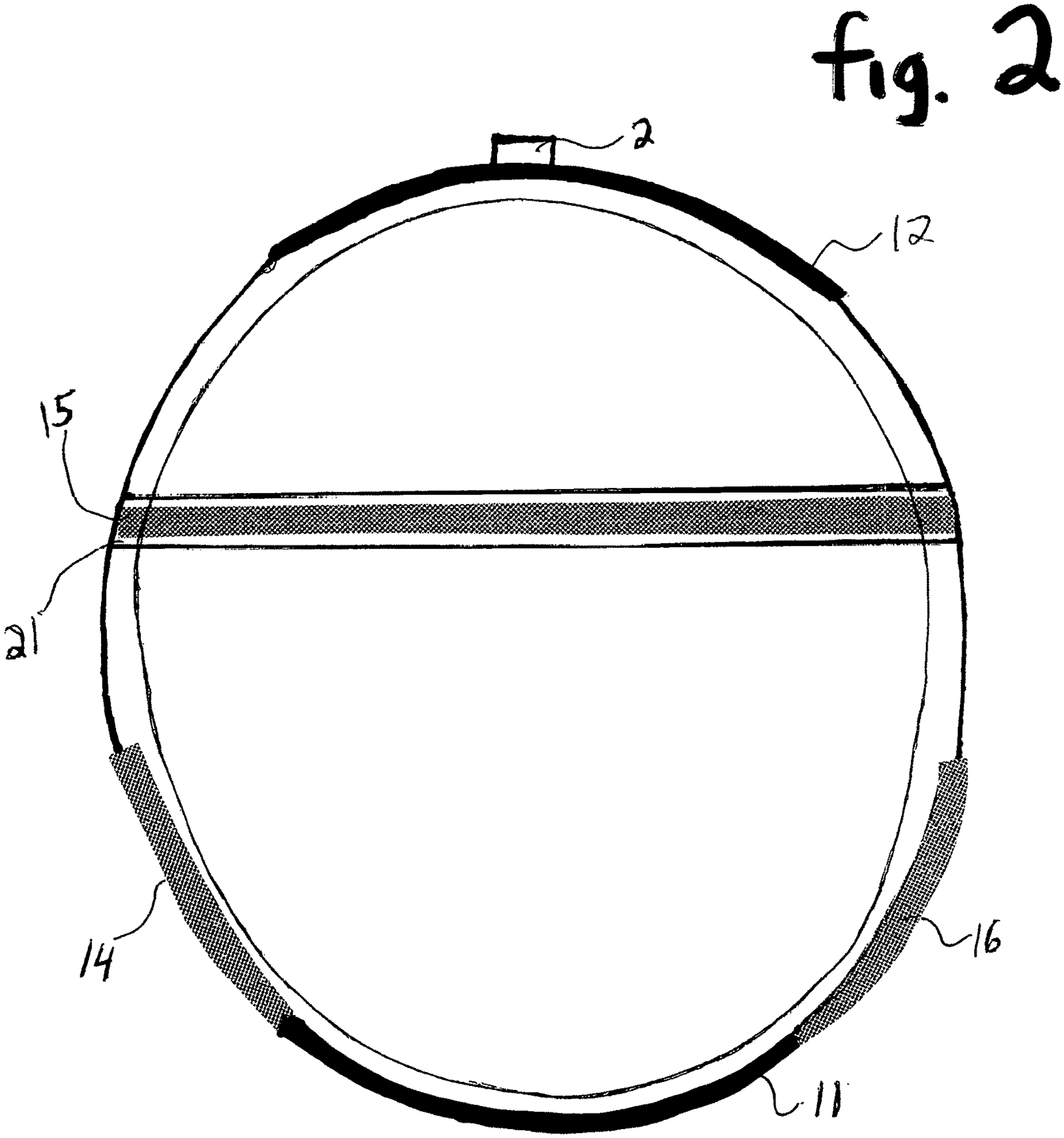
FIG. 2 shows a top view of the headband of the first embodiment.

FIGS. 1 and 2 shows a first embodiment wherein the head piece is headband 1, which contains contractile elements 14, 15, 7, 8, 17 and 19; which are electrically connected via regulator 2 and line 3 to chest band 4. Headband 1 encircles at least half of the user's cranium. Headband 1 contains contractile element 14. Headband 1 also includes occipital extension 20, which includes contractile element 17; parietal extension 21, which includes contractile element 15; and chinstrap 6, which includes contractile element 19. The contractile elements shown on one side of the user's cranium have symmetrical elements (not shown) that are located on the other side of the user's cranium. Chinstrap 6 contributes to the compression of the user's cranium by squeezing the mandible up against the temporal bone and the underside of the front of the cranium.

Piezoelectric elements in the illustrations are designated by wiggly lines. Piezoelectric elements such as step motors are advantageous for contractile elements, because they are capable of very small and precise contractions. Also, there are other electroactive polymer materials, such as ionic polymer-metal composites, that could be substituted for piezoelectric elements to power the contraction of the headband without changing the spirit of the invention.

Regulator 2 controls the precise timing and force of the contractions of the piezoelectric elements by regulating the signals sent through wires to contractile elements 14, 15, 17, and 19. Regulator 2 may fire all the contractile elements simultaneously or may stagger them to produce a wave of contraction to optimize the drainage of cerebrospinal fluid from the user's cranium.

To apply contractile forces selectively to certain areas of the user's cranium, adhesive patches can be placed on the skin of the cranium to create additional attachment means for the contractile elements. These can be temporarily affixed to the skin of the user with conventional adhesives, such as band-aids, and they contain a metal electrically conductive engagement means for engaging a connecting electrical wire, such as the adhesive pads used for EEG. In FIG. 1, adhesive patches 18 and 5 are adhered directly to the skin and connected by contractile element 7 in order to apply localized pressures to the suture between the frontal and temporal bones. Adhesive patch 5 is also connected to headband 1 by contractile element 8 that connects to headband 1 at anchor 10. By employing headband 1 as an anchor, contractile element 8 is able to deliver strong forces directed upward and forward to adhesive patch 5.

Chestband 4 in the embodiment of FIGS. 1 and 2 contains a piezoelectric generator 20, which harvests sufficient electrical energy to power the contraction of headband 1 from expansion during inhalation and then sends it through line 3 to regulator 2. Chest bands are commonly used to detect respiratory effort in home sleep testing devices used for detecting breathing effort in monitoring and diagnosing sleep apnea, and some use piezoelectric technology like the described embodiment. The advantage of using a piezoelectric chest band is that the expansive movement of the chest during inspiration is so much greater than the contractile movement of the cranium during inspiration that the chest band produces more than enough electricity to power the headband without any added power source. Also, an abdomen band employing the same technology could be substituted for a chest band without changing the spirit of the invention.

Other types of chest bands that do not produce electricity may also be suitable for detecting inspiration in the present invention. For one example, some chest bands currently used to detect inspiration in home sleep testing devices employ interference plesmythography. For another example, knitted Schoeller wool undergoes increased resistance when stretched, therefore a chest band made of that material would show an increase in electrical resistance which could be used to mark the onset and extent of inspiration. In addition, a variety of electroactive polymers could also be incorporated into a chest band to serve as a breath sensor without departing from the spirit of the invention.

Also, other types of breath sensors that are not embedded in a chest band could be used to signal the onset of inspiration. For example, airflow sensors used in CPAP machines, such as Honeywell Zephyr HAF series, are reliable breath sensors. Many breath sensors can quantify the amount of breath and thereby maintain a proportional contraction in the headband. They can also detect the direction of airflow and use that information to time the contraction of the contractile elements in the headband to alternate forces placed on the cranium during inspiration and expiration. Alternatively, the breath sensor can also be located remotely, such as a radar device that detects movement of the user's chest, from where it sends a signal to regulator 2 to proportionally activate the contractile elements to compress the cranium as needed.

If the current invention is used with a breath sensor that does not generate electricity, the needed power can be supplied by a battery attached to regulator 2 at the front of the headband or in the chestband. Very little electrical current is needed to produce the tiny forces needed to enhance drainage of cerebrospinal fluid from the cranium during sleep, because the movements required are so small, therefore batteries can supply plenty of power. Even if a power generating chest band is used, a small battery or condenser may be added to momentarily store and regulate the flow of electric current to the headband if the timing of the power supply from the chest band does not provide optimal timing of the contraction of the contractile elements.

The timing of the contraction of some of the piezoelectric elements in the headband can also be controlled to provide expansion of certain areas of the cranium in synchrony with expiration alternating with the contraction of those or other areas of the cranium during inspiration. For example, strap 21 contains contractile element 15 which is positioned to apply a pulling force that is directed across the parietal suture that runs from front to back along the top of the cranium, thereby pulling upwards and outwards on the parietal and temporal bones and producing an outward movement of the sides of the cranium alternating with the contraction of contractile elements 14, 17, and 19 to produce a movement of the cranium that is characterized by alternately expanding laterally to become shorter and wider during the contraction of contractile element 15, and then contracting laterally while expanding in length to become longer and narrower as contractile elements 14, 17, and 19 contract.

FIG. 2 shows a top view of the headband of the first embodiment. The head piece includes rigid areas 11 and 12 that serve as attachment points for the contractile elements, for example to pull the frontal and occipital bones toward each other. Relatively rigid elements and relatively elastic elements may be combined with the piezoelectric elements in various ways in the construction of the headband or helmet in order to induce specific movements such as rotations or twisting of certain cranial bones rather than simply compressing the entire cranium. For example, in patients with certain neurodegenerative pathologies, it may be desirable to maximize cerebrospinal fluid circulation in one area of the brain, and the headband may be designed to apply alternating pressure to that one area.

Frontal segment 12 and rear segment 11 generally span the frontal bones and occipital bones respectively, and they may be contoured to better fit those areas for the individual user. Segments 11 and 12 may have more rigidity than other areas of the headband. They are connected by contractile elements 14 and 16 so that the contraction of these two generally parallel and simultaneously contracting contractile elements serves to bring the occipital and frontal bones closer to each other and thereby compress the cranium between its front and back portions.

Figure 3:
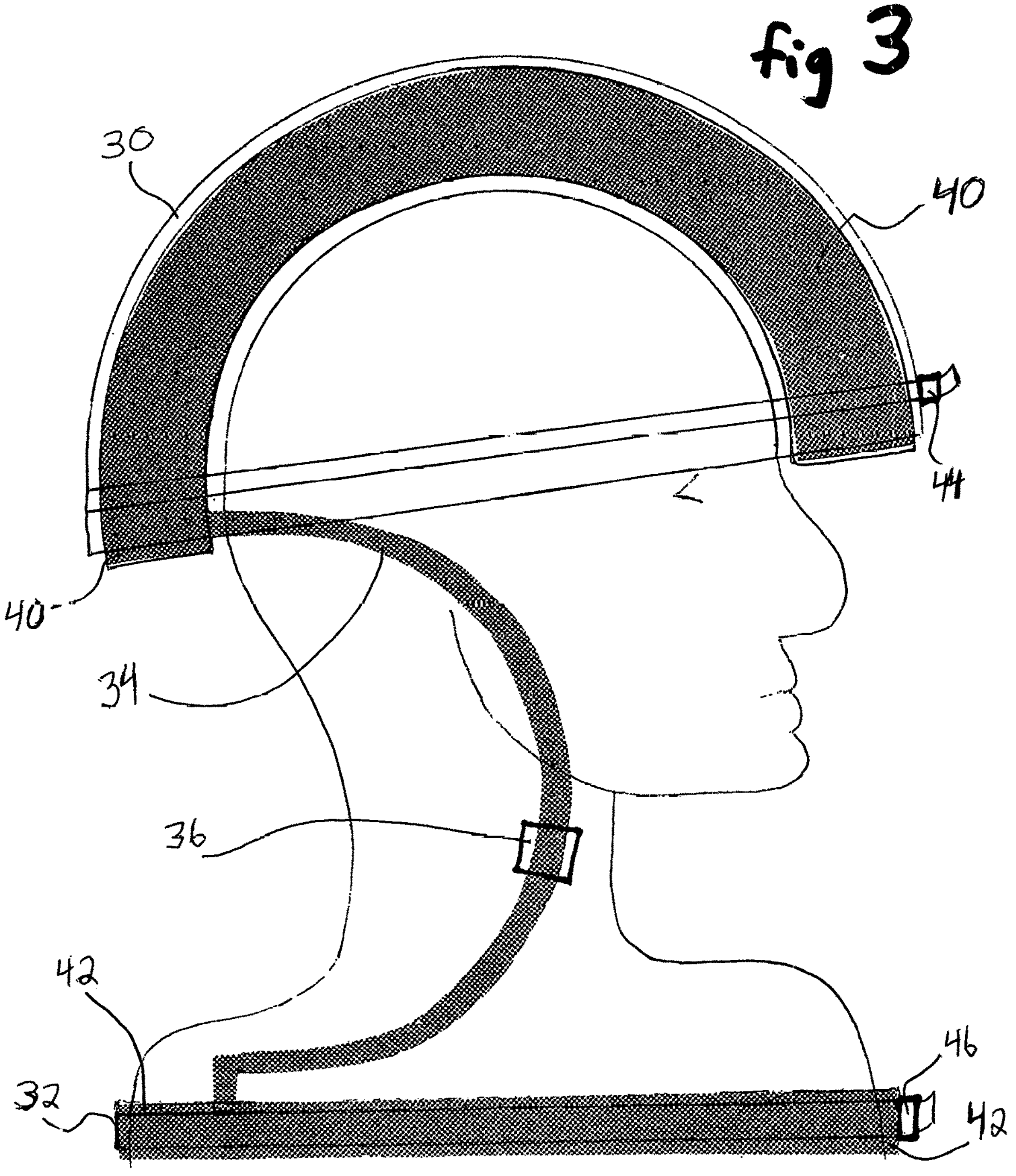
FIG. 3 shows a side view of a second embodiment in which headpiece and chest band are connected by a tube.

FIG. 3 shows an embodiment wherein the head piece 30 and chestband 32 are connected by a length of tubing 34 that communicates gas or liquid such as air or water. In this embodiment, head piece 30 covers a large portion of the cranium, like a helmet, that comprises a more rigid outer layer enclosing an inner layer comprising a flexible bladder 40; and chestband 32 comprises a more rigid outer layer that encircles an inner layer comprising a flexible bladder 42. In the figure, the gas or liquid is shaded (gray), as seen in the bladders and tubing 34.

In this embodiment, the tightness of head piece 30 and the tightness of chestband 32 can be controlled by adjusters 44 and 46 respectively to control the pressures in the bladders by either tightening the outer rigid layer covering the bladder to increase the pressure in the bladder or loosening the outer rigid layer covering the bladder to decrease pressure in the bladder.

Adjusters can be as simple as Velcro straps without changing the spirit of the invention.

In FIG. 3, the hydraulic or pneumatic forces generated by the expansion of the chest during inspiration and transferred to the bladder in the headband through tubing 34 can also be controlled by regulator 36. Regulator 36 may contain a micro proportional valve that opens and closes in synchrony with breathing to allow gas or liquids to pass in one direction during inspiration and in the opposite direction during expiration. Regulator 36 may also contain a logic circuit and electronic controls that are powered by electronic elements in the chestband 32 and also which may provide signals in proportion to the amount of movement of the chestband to regulate the flow or gas or liquid through tubing 34 to optimize pressures in the bladders to improve the circulation of cerebrospinal fluid in the cranium.

The invention claimed is:

1. An apparatus for facilitating circulation of cerebrospinal fluid in a person's cranium, the apparatus comprising:

a breath sensor for monitoring a person's respiration and for signaling when the person is inhaling and when the person is exhaling;

a compressor configured to compress the person's cranium; and a regulator configured to control the compressor based on signals from the breath sensor;

wherein the compressor is configured to compress the person's cranium upon the regulator receiving a first signal from the breath sensor that the person is inhaling, and to decompress the person's cranium upon the regulator receiving a second signal from the breath sensor that the person is exhaling.

2. The apparatus of claim 1, wherein the breath sensor comprises a chestband configured to be worn on the person's chest and a tension sensor attached to the chestband for sensing tension in the chestband;

wherein the compressor is configured to compress the person's cranium upon the regulator receiving the first signal from the breath sensor that the tension in the chestband is increasing and to decompress the person's cranium upon the regulator receiving the second signal from the breath sensor that the tension in the chestband is decreasing.

3. The apparatus of claim 2, wherein the tension sensor comprises a piezoelectric element which produces a signal indicating a magnitude of tension in the chestband; and wherein the compressor is configured to compress the person's cranium upon the regulator receiving the first signal from the breath sensor that the magnitude of the tension in the chestband is increasing and to decompress the person's cranium upon the regulator receiving the second signal from the breath sensor that the magnitude of the tension in the chestband is decreasing.

4. The apparatus of claim 2 wherein the compressor comprises a piezoelectric motor.

5. The apparatus of claim 1, wherein the breath sensor comprises a chestband configured to be worn on the person's chest and a piezoelectric generator attached to the chestband for generating electrical signals in response to changes in tension in the chestband;

wherein the chestband is configured such that as the person inhales the tension in the chestband increases and as the person exhales the tension in the chestband decreases; and wherein the compressor is configured to compress and decompress the person's cranium upon the regulator receiving the first signal from the breath sensor that the tension in the chestband is increasing and to decompress the person's cranium upon the regulator receiving the second signal from the breath sensor that the tension in the chestband is decreasing.

6. The apparatus of claim 1, wherein the compressor comprises a headpiece configured to be worn on the person's cranium.

7. The apparatus of claim 6, wherein the headpiece comprises a headband configured to be worn on the person's cranium, and a contractile element attached to the headband for contracting the headband to compress at least a portion of the person's cranium when the breath sensor signals to the regulator that the person is inhaling and for refraining from contracting the headband in order to decompress the at least a portion of the person's cranium when the breath sensor signals to the regulator that the person is exhaling.

8. The apparatus of claim 7, wherein the contractile element comprises a piezoelectric step motor.

9. The apparatus of claim 1 further comprising:

tubing; and a fluid;

wherein the breath sensor comprises a chestband configured to be worn on the person's chest, the chestband comprises a first bladder;

wherein the compressor comprises a headpiece configured to be worn on the person's cranium, the headpiece comprises a second bladder;

wherein the tubing couples the first bladder and the second bladder;

wherein the fluid resides in the tubing, the first bladder and the second bladder;

wherein the chestband is configured to compress the first bladder to force the fluid from the first bladder and into the second bladder via the tubing to cause the second bladder to expand when the person inhales, thereby compressing the person's cranium; and wherein the chestband is configured to decompress the first bladder to allow the fluid to flow from the second bladder and into the first bladder via the tubing to cause the second bladder to shrink when the person exhales, thereby decompressing the person's cranium.

10. The apparatus of claim 1 further comprising:

tubing; and a gas;

wherein the breath sensor comprises a chestband configured to be worn on the person's chest, the chestband comprises a first bladder;

wherein the compressor comprises a headpiece configured to be worn on the person's cranium, the headpiece comprises a second bladder;

wherein the tubing couples the first bladder and the second bladder;

wherein the gas resides in the tubing, the first bladder and the second bladder;

wherein the chestband is configured to compress the first bladder to force the gas from the first bladder and into the second bladder via the tubing to cause the second bladder to expand when the person inhales, thereby compressing the person's cranium; and wherein the chestband is configured to decompress the first bladder to allow the gas to flow from the second bladder and into the first bladder via the tubing to cause the second bladder to shrink when the person exhales, thereby decompressing the person's cranium.

11. A method for facilitating drainage of cerebrospinal fluid from a person's cranium, the method comprising the steps of:

monitoring the person's respiration with a breath sensor to determine when the person is inhaling and when the person is exhaling;

compressing with a compressor at least a portion of the person's cranium upon a regulator receiving a first signal from the breath sensor that the person is inhaling; and decompressing the at least a portion of the person's cranium upon the regulator receiving a second signal from the breath sensor that the person is exhaling.

12. The method in accordance with claim 11, wherein the step of monitoring the person's respiration comprises sensing when the person's chest is expanding and contracting.

13. The method in accordance with claim 12 wherein the step of monitoring the person's respiration comprises monitoring air flow in and out of the person's lungs.

14. The method in accordance with claim 11, wherein the at least a portion of the person's cranium that is compressed includes at least half of the circumference of the person's cranium.

15. The method in accordance with claim 11 wherein the step of monitoring the person's respiration comprises monitoring movement out of the person's chest.

16. The method in accordance with claim 11, wherein the compressor comprises a headpiece and the steps of compressing and decompressing the at least a portion of the person's cranium comprise mounting the headpiece on the person's cranium.

17. The method in accordance with claim 16, wherein the first signal and the second signal are variable electronic signals.

18. The method in accordance with claim 16, wherein the first signal and the second signal are conveyed by a liquid of a variable pressure indicating when the person is inhaling and when the person is exhaling.

19. The method in accordance with claim 16, wherein the first signal and the second signal are conveyed by a gas of a variable pressure indicating when the person is inhaling and when the person is exhaling.

20. A device for compressing and releasing portions of the cranium rhythmically in synchrony with a person's respiration, the device comprising:

a headband that is configured to encircle at least half of the circumference of the person's cranium; and a breath sensor that is connected with said headband;

wherein said headband contains at least one contractile portion that is activated by a regulator based on a signal from the breath sensor, the signal configured to indicate whether the person is inhaling or exhaling.

* * * * *